F. A. HILL.
Cultivator and Seeding Machine.
No. 83,158.  Patented Oct. 20, 1868.
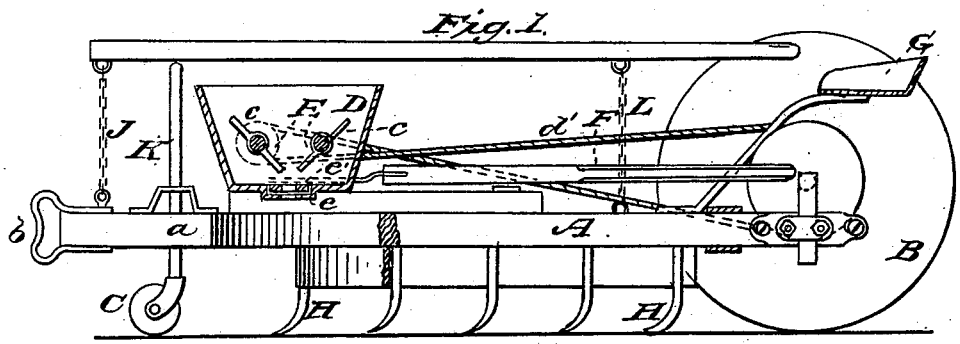
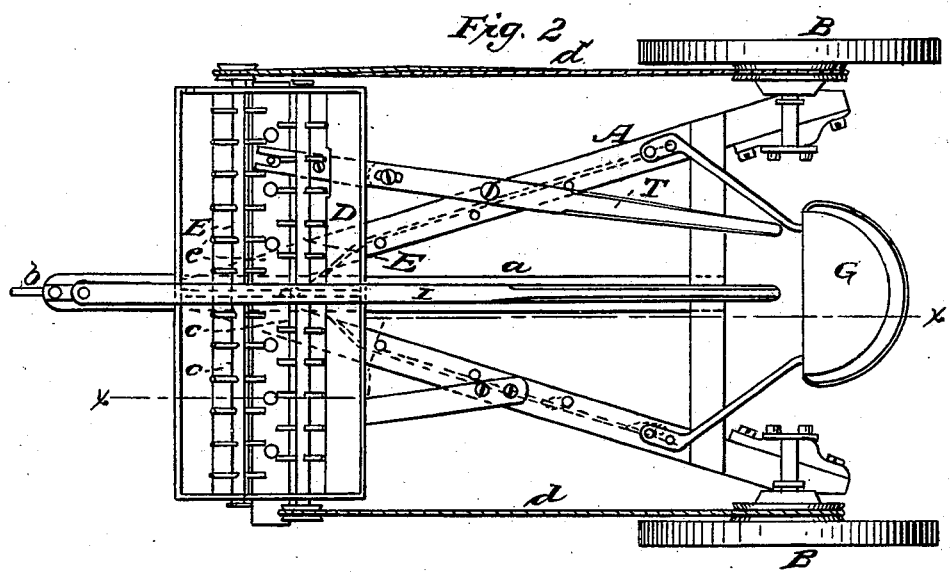

FRANK A. HILL, OF MARYSVILLE, CALIFORNIA.

Letters Patent No. 83,158, dated October 20, 1868.

IMPROVEMENT IN SEEDING-MACHINE.

The Schedule referred to in these Letters Patent and making part of the same.

*To all whom it may concern:*

Be it known that I, FRANK A. HILL, of Marysville, in the county of Yuba, and State of California, have invented a new and improved Sulky-Cultivator and Seeding-Machine; and I do hereby declare that the following is a full, clear, and exact description thereof, which will enable those skilled in the art to make and use the same, reference being had to the accompanying drawings, forming part of this specification.

This invention relates to a new and improved sulky-cultivator and seeding-machine; and it consists in a novel construction and arrangement of parts, whereby the rider and driver has perfect control over the implement, both as regards the sowing of the seed and the adjustment of the shares or teeth.

In the accompanying sheet of drawings—

Figure 1 is a side sectional view of my invention, taken in the line $x\ x$, fig. 2.

Figure 2, a plan or top view of the same.

Similar letters of reference indicate corresponding parts.

A represents the frame of the machine, which is of V-form, and supported at its rear end by wheels B B, the front end being supported by a caster-wheel, C.

The frame is provided with a longitudinal central bar, $a$, which projects forward of the frame A, and has a clevis, $b$, at its front end, to which the draught-animals are attached.

On the front part of the frame A, there is secured a seed-box, D, having two parallel shafts E E placed longitudinally within it, through which teeth $c$ pass at equal distances apart.

The shafts E E are rotated by belts $d\ d'$, from the wheels B B, the belt $d'$ being a cross-belt, and $d$ a straight one, in order that said shafts may be rotated in reverse directions, as indicated by the arrows in fig. 1.

The seed-box has its front and rear sides inclined, as shown in fig. 1, and at the bottom of the seed-box there is a fixed, stationary perforated plate, $e$, and a similar sliding plate, $e'$, is placed over $e$, the plate $e'$ being adjusted or moved by a lever, F, extending back to within convenient reach of the driver on seat G.

By adjusting this plate $e'$, the capacity of the perforations in the plates may be varied, as desired, in order to sow a greater or less quantity of seed over a given area, or the discharge of seed entirely cut off when desired.

H represent the shares or teeth, which are attached to the frame A, as usual; and I is a bar, the front end of which is connected by a chain, J, with the front end of the frame A, said bar bearing on the upper end of the shaft K of the caster-wheel, and extending back within convenient reach of the driver on seat G.

By depressing the rear end of bar I, the frame A will be raised, and the shares or teeth elevated entirely above the earth, if desired, and by securing the rear end of said bar by a chain, L, the shares or teeth may be made to penetrate the earth at a greater or less distance, as required.

The revolutions of the toothed shafts E E, insure an even discharge of seed from the seed-box, and prevent the clogging of the former in the latter.

If necessary or desired, a scattering-board may be placed underneath the seed-box, to receive the seed, and scatter the same broadcast upon the earth.

I claim as new, and desire to secure by Letters Patent—

The frame A, provided with the shares or teeth H, in combination with seed-box D, provided with the toothed shafts E E, rotated in opposite directions from the wheels B B, and also provided with the fixed and adjustable perforated plates $e\ e'$, all arranged to operate in the manner substantially as and for the purpose set forth.

FRANK A. HILL.

Witnesses:
GEO. ROBT. BAGNELL,
G. W. LAMDIN,
A. J. LUCAS.